Apr. 24, 1923.
R. F. RASMUSSEN
1,452,705
STOCK WATERING DEVICE
Filed Dec. 26, 1919
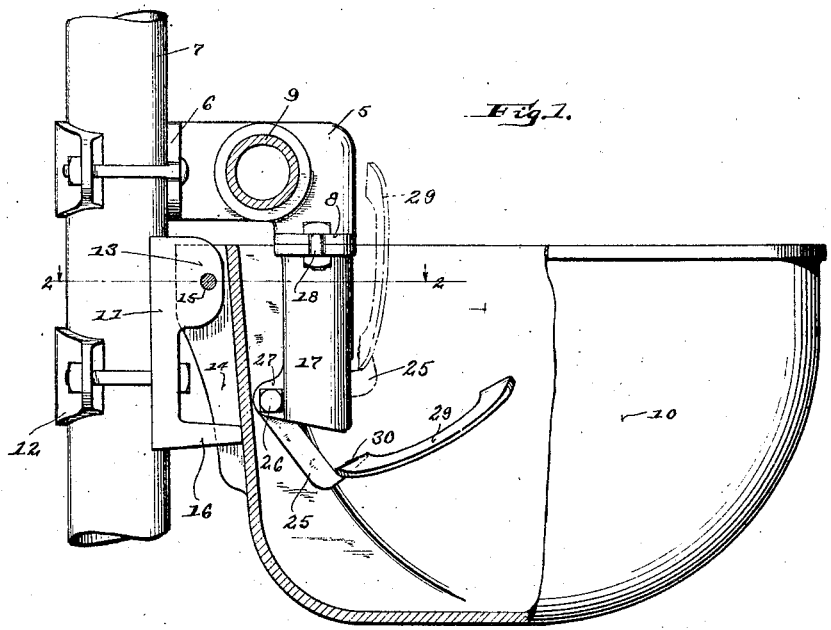
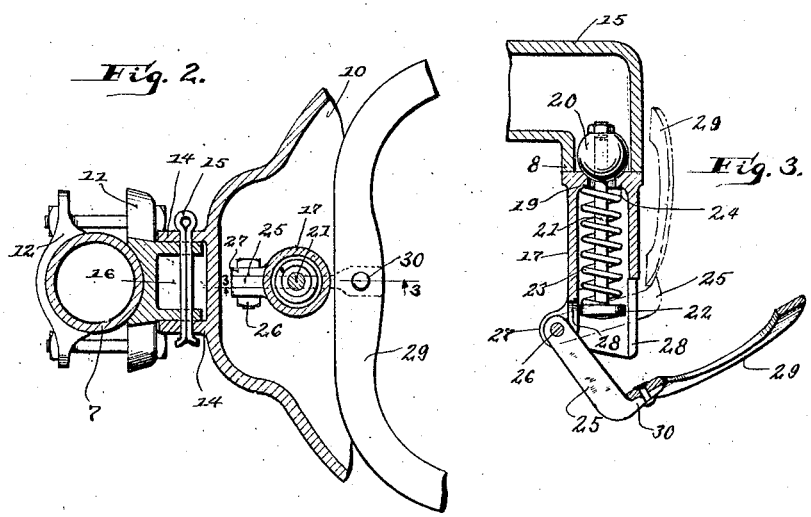
Inventor
Robert F. Rasmussen
By Morrell & Keeney
Attorneys.

Patented Apr. 24, 1923.

1,452,705

UNITED STATES PATENT OFFICE.

ROBERT F. RASMUSSEN, OF OSHKOSH, WISCONSIN, ASSIGNOR TO C. A. LIBBEY COMPANY, OF OSHKOSH, WISCONSIN, A CORPORATION OF WISCONSIN.

STOCK-WATERING DEVICE.

Application filed December 26, 1919. Serial No. 347,277.

*To all whom it may concern:*

Be it known that I, ROBERT F. RASMUSSEN, a citizen of the United States, and resident of Oshkosh, Wisconsin, in the county of Winnebago and State of Wisconsin, have invented new and useful Improvements in Stock-Watering Devices, of which the following is a description, reference being had to the accompanying drawings, which are a part of this specification.

The present invention relates to certain new and useful improvements in stock watering devices and more particularly to the valve and valve operating mechanism used in connection with the bowl.

This invention has for one of its objects to provide a valve operating plate which when operated to open the valve will permit the cattle to have access to the entire bottom of the bowl.

A more specific object of this invention is to provide a valve operating plate which is movable upwardly and rearwardly away from the bottom of the bowl to open the valve.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a side view of my complete bowl, parts being broken away and in section to more clearly illustrate its structural details.

Figure 2 is a sectional view taken through the bowl support securing means and valve on the line 2—2 of Figure 1, and Figure 3 is a sectional view taken through the valve mechanism on the line 3—3 of Figure 2.

In the drawing, the supply pipe consists of an elbow section 5 having a flange end 6 for clamping engagement with a suitable support 7, a flanged down turned end 8 for receiving the valve mechanism to be later described and an inlet portion for receiving the end of a water supply pipe 9.

The numeral 10 designates a bowl which is detachably connected to the support 7 just below the elbow section 5 by means of a bowl detaching member 11 secured to the support by a clamp 12 and having spaced upward ears 13 engageable between spaced lugs 14 secured to the rear wall of the bowl, the ears 13 being secured between the lugs 14 by means of a dowel or split pin 15 passed through aligned apertures therein. The bowl is held in its proper position by means of a projection 16 formed on the lower end of the bowl support 11 and projecting between the lugs 14 to prevent the lateral movement of the bowl with respect to the support.

As best shown in Figure 1 the discharge end 8 of the elbow 5 is projected into the bowl 10 and has a valve casing 17 secured thereto by means of bolts 18 which casing has a valve mechanism contained therein.

The casing 17 has a restricted opening 19 in its upper end providing a seat for a valve 20 which has its stem 21 passed downwardly therethrough and provided with an enlarged head or end 22. The valve 20 is normally held in engagement with its seat by means of an expansile spring 23 coiled about the stem 21 and confined between the head 22 and shoulder 24 surrounding the opening 19. This structure normally maintains the valve 20 in engagement with its seat and means are provided for unseating the valve 20 against the action of spring 23 to permit water to be discharged through the casing 17 into the interior of the bowl.

The means for operating the valve mechanism consists of a lever 25 having its rear end pivoted as at 26 between ears 27 formed on the casing 17 which has its walls oppositely recessed as at 28 to permit the lever 25 to be moved upwardly to raise the end 22 and consequently the valve 20. The lever 25 is adapted to be operated by the cattle by means of a valve operating plate or the like 29 secured to the forward end 30 of the lever 25.

In the bowls now in use it is necessary to depress the plate or to swing the plate to the side to open the valve mechanism which is objectionable as the same covers the bottom of the bowl and does not permit the cattle to drink as freely. My invention is designed to have the plate 29 moved away from the bottom of the bowl, see dotted lines Figures 1 and 3, to open the valve. This is accomplished by means of the novel structure hereinbefore described.

What I claim as my invention is:

1. In a stock watering device the combination with a bowl and a supply pipe of a substantially vertically disposed nozzle adapted to discharge from said pipe into said bowl, said nozzle being provided with a plurality of alined slots; a valve within said nozzle adapted to control fluid flow therethrough; and a stock operated valve actuating member provided with a lever one end of which is pivotally secured to said nozzle and an intermediate portion of which is adapted to enter said slots to engage a portion of said valve to open the same.

2. In a stock watering device, the combination with a bowl and a supply pipe having a substantially vertical discharge nozzle arranged to discharge in the bowl and positioned juxtaposed the wall thereof, of a valve member having a seat in said nozzle, and a valve operating member engageable with the valve member and having its rear end pivotally mounted and adapted, upon movement of its free end away from the bottom of the bowl to a substantially vertical position against the discharge nozzle, to actuate said valve member and discharge water from the supply pipe into said bowl.

3. A stock watering device comprising a bowl, a supply pipe, a discharge nozzle secured to the discharge end of the supply pipe and arranged to discharge in said bowl, a valve member having a seat in said nozzle, spring means normally yieldingly urging said valve member to engage its seat, a valve stem extended from the valve member, a lever pivoted to the rear wall of said discharge nozzle and adapted to be moved into said discharge nozzle through aligned slots in its walls to move the valve stem and unseat the valve member, and a plate secured to said lever.

In testimony whereof, I affix my signature.

ROBERT F. RASMUSSEN.